United States Patent
Corsmeier (10) Patent No.: US 11,420,265 B2
(45) Date of Patent: Aug. 23, 2022

(54) APPARATUS AND METHOD FOR CONTINUOUS ADDITIVE MANUFACTURING

(71) Applicant: General Electric Company, Schenectady, NY (US)

(72) Inventor: Donald Michael Corsmeier, Cincinnati, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 90 days.

(21) Appl. No.: 17/062,715

(22) Filed: Oct. 5, 2020

(65) Prior Publication Data

US 2021/0023621 A1    Jan. 28, 2021

Related U.S. Application Data

(62) Division of application No. 15/609,965, filed on May 31, 2017, now Pat. No. 10,821,514.

(51) Int. Cl.
*B33Y 10/00* (2015.01)
*B22F 12/00* (2021.01)
(Continued)

(52) U.S. Cl.
CPC .............. *B22F 12/00* (2021.01); *B22F 10/20* (2021.01); *B33Y 10/00* (2014.12); *B33Y 30/00* (2014.12); *B22F 10/10* (2021.01)

(58) Field of Classification Search
None
See application file for complete search history.

(56) References Cited

U.S. PATENT DOCUMENTS

| 6,093,449 A | 7/2000 | Carter, Jr. et al. |
| 7,291,002 B2 | 11/2007 | Russell et al. |
| (Continued) | | |

FOREIGN PATENT DOCUMENTS

| CN | 102266942 A | 12/2011 |
| CN | 104245284 A | 12/2014 |
| (Continued) | | |

OTHER PUBLICATIONS

Chinese Office Action and Search Report Corresponding to CN201810548732 dated Jan. 6, 2020.

*Primary Examiner* — Anthony M Liang
(74) *Attorney, Agent, or Firm* — Dority & Manning, P.A.

(57) ABSTRACT

An apparatus for continuous powder-based additive manufacturing of a large annular object or multiple smaller objects simultaneously is described. The build unit(s) of the apparatus includes a powder delivery mechanism, a powder recoating mechanism and an irradiation beam directing mechanism. The build unit(s) is attached to a rotating mechanism such that the build unit(s) rotates around and above the annular powder bed during production. The rotating mechanism is supported onto a central tower, and both the rotating mechanism and the tower are concentric with the non-rotating annular powder bed. An additive manufacturing method using the apparatus involves repetitive and continuous cycles of at least simultaneously rotating the build unit(s) to deposit powder onto the powder bed and irradiating the powder to form a fused additive layer. The continuous additive manufacturing process may be further aided with a helical configuration of the powder bed build surface.

13 Claims, 10 Drawing Sheets

(51) Int. Cl.
  *B33Y 30/00*     (2015.01)
  *B22F 10/20*     (2021.01)
  *B22F 10/10*     (2021.01)

(56) References Cited

U.S. PATENT DOCUMENTS

| | | |
|---|---|---|
| 7,296,990 B2 | 11/2007 | Devos et al. |
| 7,556,490 B2 | 7/2009 | Wicker et al. |
| 7,959,847 B2 | 6/2011 | Wicker et al. |
| 9,908,294 B2 | 3/2018 | Carrouset et al. |
| 10,384,435 B2 | 8/2019 | Thorson et al. |
| 2014/0191439 A1 | 7/2014 | Davis |
| 2015/0283751 A1 | 10/2015 | O'Neill |
| 2016/0170416 A1 | 6/2016 | McGrego et al. |
| 2016/0193695 A1 | 7/2016 | Haynes |
| 2016/0279705 A1 | 9/2016 | Mironets |
| 2016/0339642 A1 | 11/2016 | Paetz |
| 2018/0311731 A1 | 11/2018 | Spicer |

FOREIGN PATENT DOCUMENTS

| | | |
|---|---|---|
| CN | 104498943 A | 4/2015 |
| CN | 104718047 A | 6/2015 |
| CN | 105026125 A | 11/2015 |

APPARATUS AND METHOD FOR CONTINUOUS ADDITIVE MANUFACTURING

CROSS REFERENCE TO RELATED APPLICATIONS

This application claims priority to, and is a divisional application of, U.S. patent application Ser. No. 15/609,965 filed May 31, 2017 which is incorporated by reference in its entirety herein.

INTRODUCTION

The present disclosure generally relates to additive manufacturing apparatuses and methods. More specifically, the present disclosure relates to apparatuses and methods that enable a continuous process of additively manufacturing a large annular object or multiple smaller objects simultaneously, such as but not limited to components of an aircraft engine.

BACKGROUND

Additive manufacturing (AM) encompasses a variety of technologies for producing components in an additive, layer-wise fashion. In powder bed fusion which is one of the most popular AM technologies, a focused energy beam is used to fuse powder particles together on a layer-wise basis. The energy beam may be either an electron beam or laser. Laser powder bed fusion processes are referred to in the industry by many different names, the most common of which being selective laser sintering (SLS) and selective laser melting (SLM), depending on the nature of the powder fusion process. When the powder to be fused is metal, the terms direct metal laser sintering (DMLS) and direct metal laser melting (DMLM) are commonly used.

Figure 1:
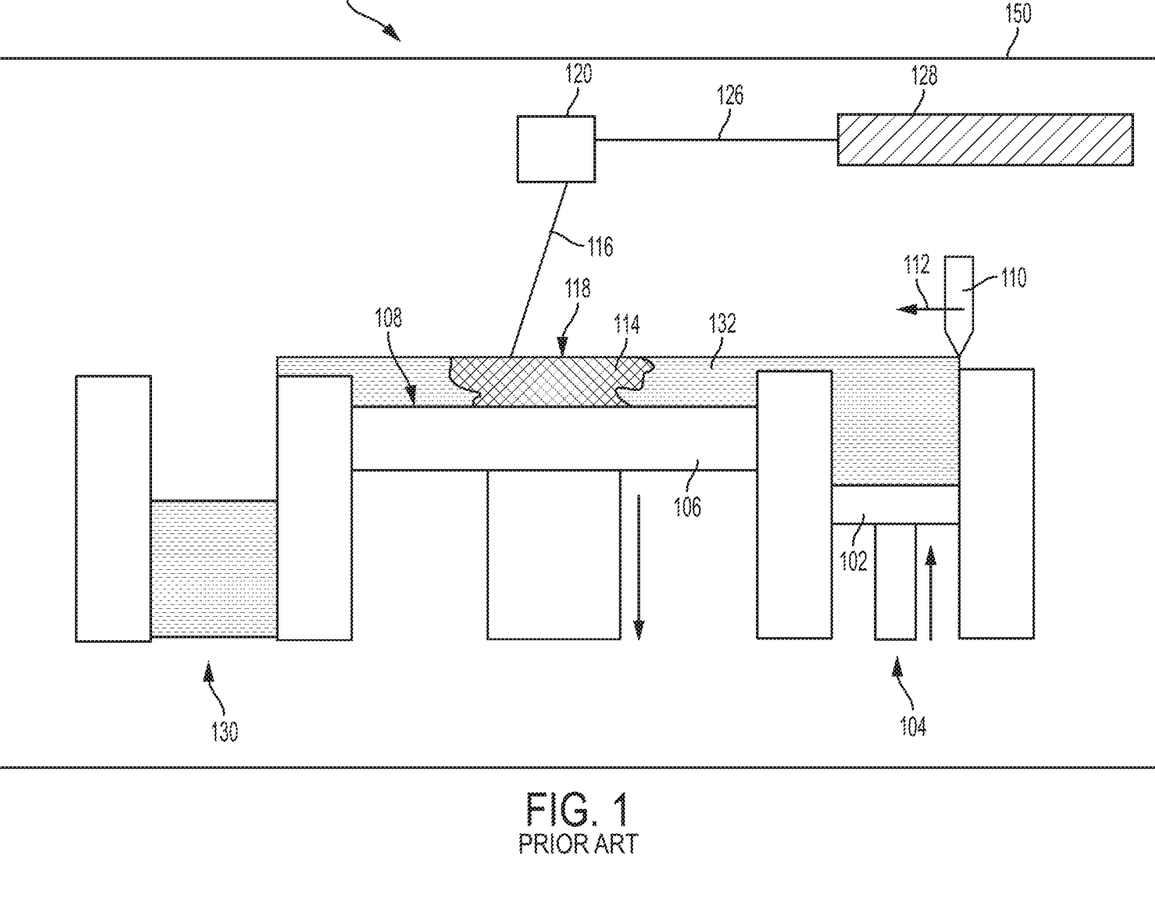
FIG. 1 shows an exemplary prior art powder-based system for additive manufacturing.

A description of a typical laser powder bed fusion process is provided as follows. Referring to FIG. 1, a laser powder bed fusion system such as the system 100 includes a fixed and enclosed build chamber 150. Inside the build chamber 150 is a build plate 106 that is flanked by a feed powder reservoir 104 at one end and an excess powder receptacle 130 at the other end. During production, an elevator 102 in the feed powder reservoir 104 lifts a prescribed dose of powder above the level of a build plate 106. The prescribed dose of powder is then spread in a thin, even layer 132 over the build surface 108 by a recoater mechanism 110. For example, as shown in FIG. 1, the powder is spread in a direction as indicated by the arrow 112. Overflows from the build plate 106 are collected by the excess powder receptacle 130, then optionally treated to sieve out rough particles before re-use. Current powder bed technologies are discrete and intermittent in that the laser or electron beam must pause to wait for the subsequent layer of powder to be leveled.

The recoater mechanism 110 may be a hard scraper, a soft squeegee, or a roller. A selective portion of the powder 114 that corresponds to a "slice" or a layer of the part to be manufactured is then sintered or melted by a focused laser 116 scanning across the surface of the selective portion 118. In other words, the powder layer 132 is subjected to laser radiation in a site-selective manner in dependence on computer-aided design (CAD) data, which is based on the desired geometry of the work piece that is to be produced. The laser irradiation sinters or melts the raw material powder, and the sintered/melted area then re-solidifies and re-crystallizes into a fused region of the work piece.

Using a plurality of movable mirrors or scanning lenses, a galvanometer scanner 120 moves or scans the focal point of the unfocused laser beam 126 emitted by the laser source 128 across the build surface 108 during the SLM and SLS processes. The galvanometer scanner in powder bed fusion technologies is typically of a fixed position but the movable mirrors/lenses contained therein allow various properties of the laser beam to be controlled and adjusted.

As of now, powder bed technologies have demonstrated the best resolution capabilities of all known metal additive manufacturing technologies. However, since the build needs to take place in the powder bed, conventional machines use a large amount of powder. For example, a powder can be over 130 kg or 300 lbs. This is costly and wasteful, especially considering the environment of a large facility using a large number of machines. The powder that is not directly sintered or melted into the built object but is nevertheless distributed over the powder bed is problematic because not only does it add weight to the elevator systems (conventional powder beds are typically lowered as successive layers of powder are built up), complicate seals and chamber pressure, it is detrimental to object retrieval at the end of the built, and becomes unmanageable in large bed systems that are currently being considered for large objects. For instance, the amount of powder needed to make a large object may exceed the limits of the powder bed or make it difficult to control the lowering of the powder bed at a precision that is sufficient to make highly uniform additive layers in the object being built.

In view of the foregoing, there exists a need for additive manufacturing apparatuses and methods that can handle production of large objects with improved precision and in a manner that is both time- and cost-efficient with a minimal waste of raw materials.

SUMMARY

In a first aspect, the present invention relates to an additive manufacturing apparatus that includes at least one build unit that comprises a powder delivery mechanism, a powder recoating mechanism and an irradiation beam directing mechanism; a build platform; and a rotating mechanism to which at least a portion of the at least one build unit is attached that provides rotational movement around a center of rotation to the at least one build unit, such that the at least one build unit moves in a circular path about the center of rotation. Preferably, the build platform is annular. Preferably, the build platform and the rotating mechanism are concentric.

In certain embodiments, the apparatus further includes a tower onto which the rotating mechanism is supported, the build platform, the rotating mechanism and the tower are concentric.

Preferably, the build platform and the rotating mechanism are concentric.

Preferably, at least portion of the at least one build unit is attached to the circumference of the rotating mechanism.

In certain embodiments, the apparatus further includes a build chamber encasing the apparatus.

In certain embodiments, the apparatus further includes a support arm, wherein at least portion of the at least one build unit is attached to the rotating mechanism via the support arm.

In some embodiments, the build platform includes an inner wall and an outer wall. In one embodiment, the inner wall and the outer wall each include one or more receptacles to catch powder spillover.

In one embodiment, the build platform is non-rotating and vertically stationary. In an alternative embodiment, the build platform is non-rotating and vertically movable.

In some embodiments, the tower is vertically movable.

In some embodiments, the irradiation beam directing mechanism includes a laser source or an electron source.

In some embodiments, the build platform includes a build surface that has a helical configuration.

In a second aspect, the present invention relates to a method of manufacturing at least one object. The method includes the steps of: (a) rotating at least one build unit around a center of rotation to deposit powder onto a build platform, such that the at least one build unit moves in a circular path about the center of rotation; (b) irradiating at least one selected portion of the powder to form at least one fused layer; and (c) repeating at least steps (a) and (b) to form the at least one object. In some embodiments, the method further includes a step (d) of leveling the at least one selected portion of the powder. Preferably, at least steps (a), (b) and (d) are carried out simultaneously and continuously. In some embodiments, the method further includes a step of moving the build platform vertically.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. For example, the present invention provides a preferred method for additively manufacturing metallic components or objects, and preferably these components or objects are used in the manufacture of jet aircraft engines. In particular, large, annular components of jet aircraft engines can be advantageously produced in accordance with this invention. However, other components of an aircraft and other non-aircraft components may be prepared using the apparatuses and methods described herein.

The present invention provides a large-scale additive manufacturing apparatus and embodiments of the apparatus that can be used to perform powder bed based additive manufacturing, including but not limited to selective laser sintering (SLS), selective laser melting (SLM), direct metal laser sintering (DMLS), direct metal laser melting (DMLM) and electron beam melting (EBM) processes. The present invention also includes methods for utilizing the apparatus or an embodiment thereof to additively manufacture objects. The apparatus of the present invention includes components that make it particularly useful for making large objects that are substantially annular or cylindrical in a continuous manner where the powder deposition, powder leveling, beam irradiation and vertical sliding of the central tower and/or powder bed can occur simultaneously. As used herein, the term "continuous" means that a process or a specific step of a process or a movement (e.g. powder deposition, powder leveling, beam irradiation or vertical sliding of the central tower and/or powder bed) is uninterrupted in time and has no interstices or intervals of time. As used herein, the term "simultaneous" means that two or more processes or specific steps of a process (powder deposition, powder leveling, beam irradiation and vertical sliding of the central tower and/or powder bed) are taking place concurrently or coincidentally in time. Examples of these substantially annular or cylindrical objects are annular or cylindrical components of an aircraft engine or an aircraft. Examples of such aircraft components are turbine or vane shroudings, central engine shaft, casings, compressor liners, combustor liners, ducts, etc. In some instances, these components can have a radius of up to 2 meter. Additionally, multiple smaller objects can be arranged appropriately on the build platform to be simultaneously built.

Accordingly, an additive manufacturing apparatus of the present invention includes an annular powder bed instead of a conventional rectangular powder bed. There is provided a rotating mechanism, to which a build unit is attached. The build unit includes a powder delivery mechanism, a powder recoating mechanism and an irradiation beam directing mechanism. The rotating mechanism, which is preferably concentric with the powder bed, positions the build unit above and suitably substantially parallel to the annular powder bed and rotationally moves the build unit above and suitably substantially parallel the powder bed to simultaneously level powder and melt powder to form a fused layer of the build object at one or more build areas within the powder bed. In some embodiments, the rotating mechanism is attached and supported onto a central, erect tower which is also preferably concentric with the non-rotating annular powder bed.

As used herein, the term "mechanism" refers to a structural entity that is either single device or instrument, a single device or instrument having multiple components, or a system of multiple, distinct devices or instruments. The term "mechanism" is used interchangeably with the term "unit", which bears the same definition as set forth in the foregoing sentence.

Figure 2A:
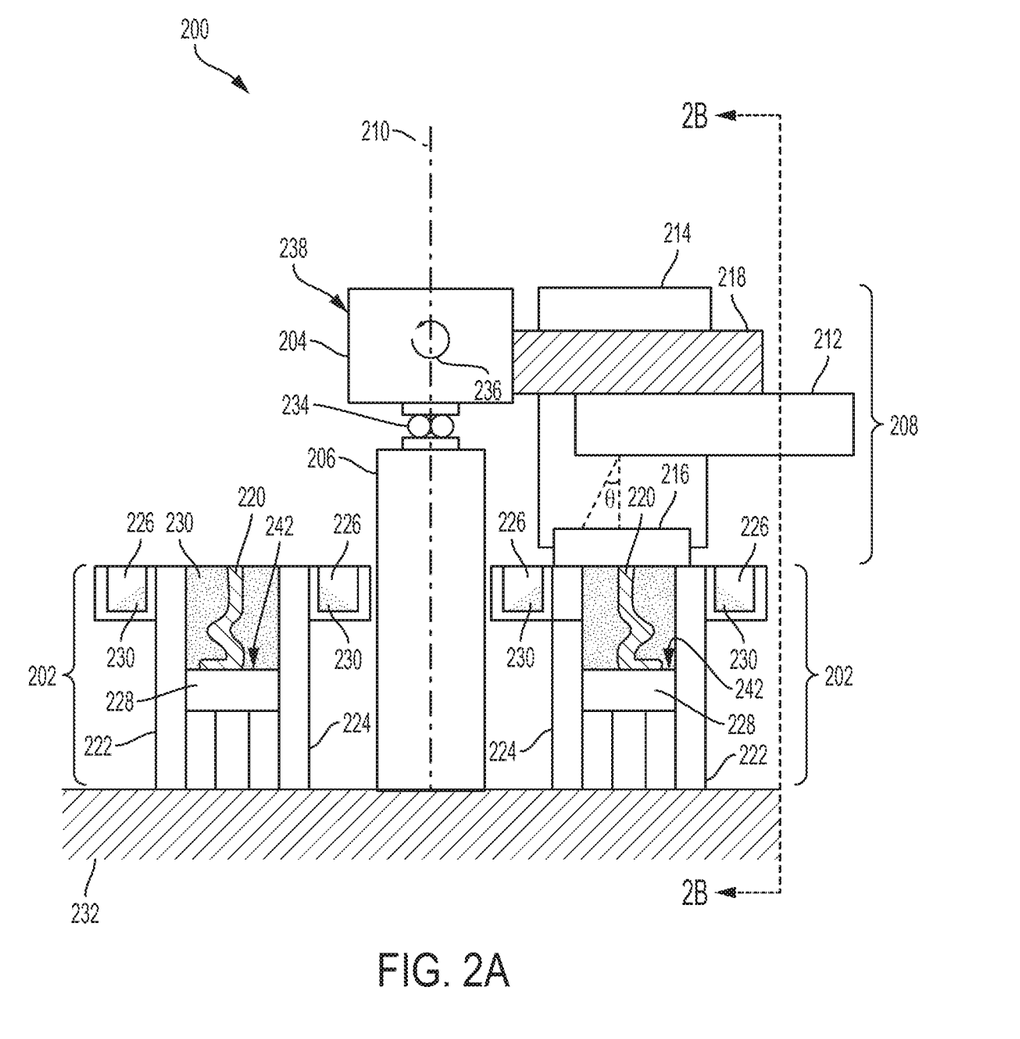
FIG. 2A is a schematic front cross-sectional view of a large-scale additive manufacturing apparatus according an embodiment of the present invention with an annular powder bed and a mechanism that rotates the build unit.

FIG. 2A is a schematic front cross-sectional view of a large-scale additive manufacturing apparatus 200 in accordance with an embodiment of the present invention. The apparatus 200 includes an annular powder bed 202 and a build unit 208. The annular powder bed 202 has a build platform 228, a circular inner wall 224 and a circular outer wall 222 with a diameter that is greater than the diameter of the inner wall 224. At the beginning of a powder-based additive manufacturing process, the raw material powder is deposited onto the build surface 242 which is the top surface of the build platform 228. In some embodiments, such as the embodiment shown in FIG. 2A, the inner and outer walls 224, 222 of the annular powder bed 202 each include a receptacle 226 to capture unfused powder spillover during production. The apparatus 200 further includes a build unit 208 which has several components each serving different functions in a powder-based additive manufacturing process such as but not limited to selective laser melting (SLM), direct metal laser melting (DMLM) and electron beam melting (EBM). Among the components of the build unit 208 are, for example, a powder delivery mechanism 214 (e.g. a hopper), an irradiation beam directing mechanism 212 and a recoating mechanism 216. The recoating mechanism 216 may be a scraper, blade, squeegee, roller or the like.

During an additive manufacturing process, the powder delivery mechanism 214 directionally delivers and deposits a raw material powder 230 onto and/or into the powder bed 202. The powder recoating mechanism 216 directionally spreads and levels the deposited powder 230 into a substantially even powder layer, and a portion of this substantially even powder layer (i.e. a build area) is then melted by the laser or electron beam emitted by the irradiation beam directing mechanism 212 to form a fused, additive layer of the built object 220. This irradiation beam is indicated with a dashed line throughout the accompanying figures. This manufacturing cycle repeats itself, which results in multiple layers being stacked to form the growing built object 220. Although FIG. 2C shows a single built object 220, it should be appreciated that the large-scale additive manufacturing apparatus 200 may be used to additively and simultaneously manufacture multiple smaller objects in the annular powder bed 202.

Representative examples of suitable materials for a raw material powder used during an additive manufacturing process of the present invention include alloys that have been engineered to have good oxidation resistance, known "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-750, ECY 768, 282, X45, PWA 1483 and CMSX (e.g. CMSX-4) single crystal alloys. The manufactured objects of the present invention may be formed with one or more selected crystalline microstructures, such as directionally solidified ("DS") or single-crystal ("SX").

Importantly, in accordance with the present invention, all three integral steps of powder deposition, powder leveling and powder melting happen concurrently and continuously. Preferably, these three steps of the powder-based additive manufacturing process take place concurrently and continuously at multiple build areas. For example, at a given point in time, the powder delivery mechanism 214 deposits the powder 230 at a region or build area C (not shown) in the powder bed 202; the powder recoating mechanism 216 levels the powder 230 into a substantially even powder layer at a region or build area B (not shown) where the powder delivery mechanism 214 previously deposited the powder 230; and the irradiation beam directing mechanism 212 melts a selective area (i.e. region or build area A which is not shown) within a substantially even powder layer previously leveled by the powder recoating mechanism 216.

The build unit 208 is attached to a rotating mechanism 204 that is operable to rotate the build unit around the rotational axis 210 360°. In one embodiment, the build unit 208 is directly attached to an area on the circumference 238 of the rotating mechanism 204. In an alternative embodiment, a support arm 218 emanates from the circumference of the rotating mechanism, upon which at least one of the powder delivery mechanism 214, the irradiation beam directing mechanism 212 and the recoating mechanism 216 is mounted. Alternatively, the build unit 208 is attached to the bottom surface 240, either directly or indirectly via a support arm.

Figure 2B:
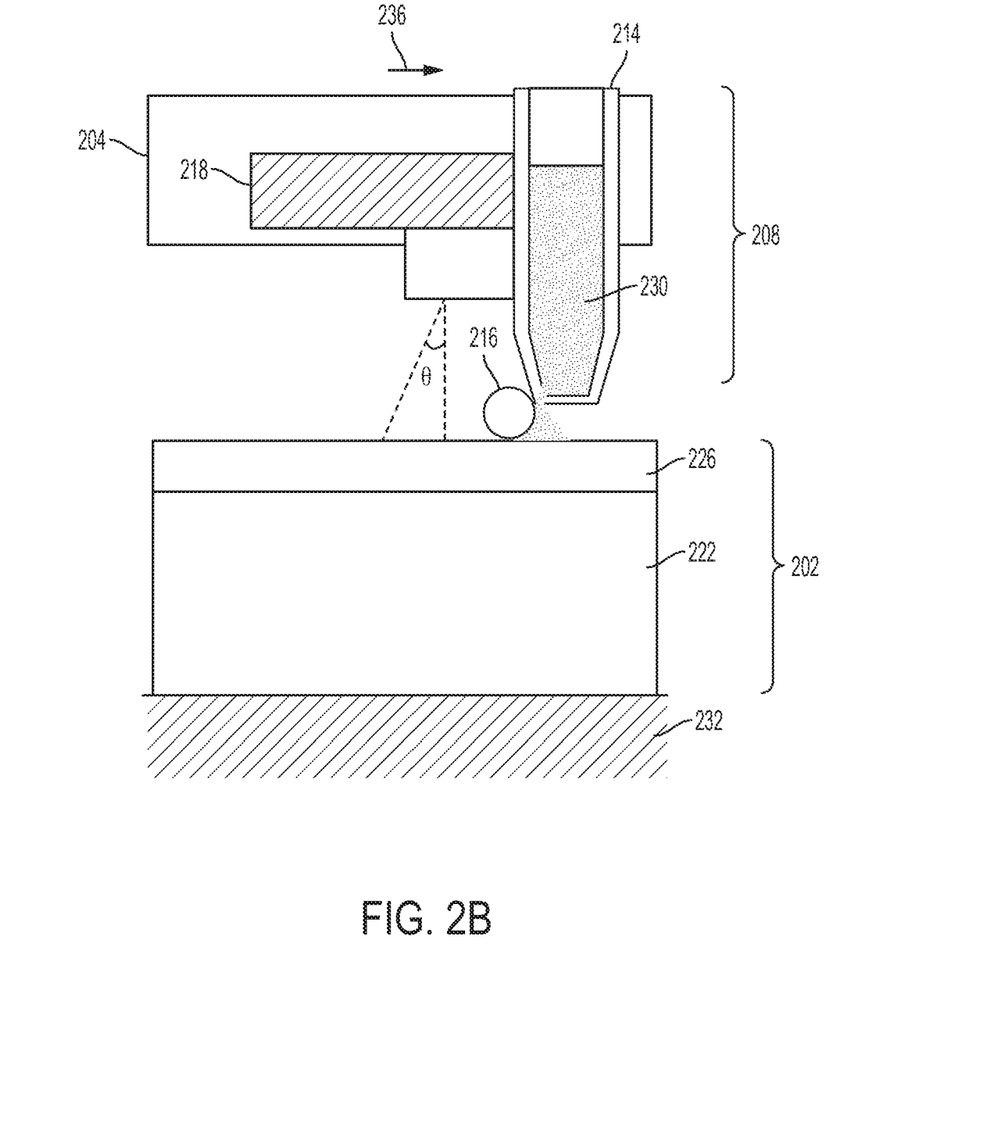
FIG. 2B is a B-B' side cross-sectional view of the large-scale additive manufacturing apparatus of FIG. 2A.
Figure 2C:
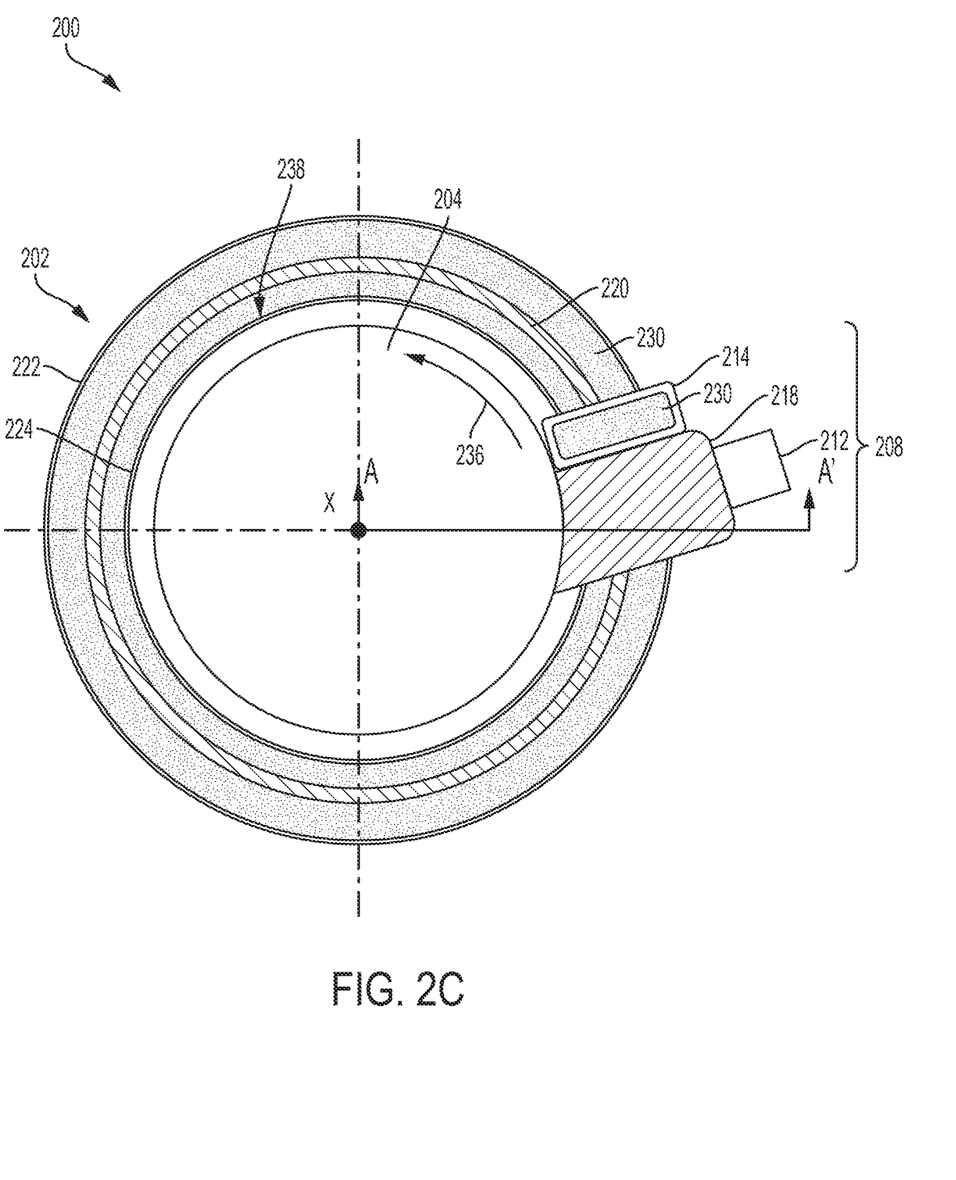
FIG. 2C is a schematic top view of the large-scale additive manufacturing apparatus of FIG. 2A.

In FIG. 2B, it is shown that the powder delivery mechanism 214 and the irradiation beam directing mechanism 212 are secured to the support arm while the powder recoating mechanism 216 is attached to the powder delivery mechanism 214, specifically at the gate at the bottom portion of the powder delivery mechanism 214 where the powder 230 is dispensed. Since the build unit 208 deposits, levels and melts the powder 230 in this particular order, it may be advantageous to arrange the related three components imparting these functions such that, in relation to the rotational direction indicated by the arrow 236 of the rotating mechanism 204, the powder delivery mechanism 214 precedes the powder recoating mechanism 216, which is then followed by the irradiation beam directing mechanism 212.

In accordance with the present invention, the rotating mechanism 204 is a rigid structure having a cylindrical configuration as embodied in the accompanying figures, or alternatively an annular or ring or doughnut configuration.

While the build unit 208 is attached to the rotating mechanism 204, the rotating mechanism 204 in turn may be attached and supported onto a tower 206, for example, via a connector 234. In this embodiment, the connector is shown as a ball bearing that is sandwiched between an upper race and a lower race. It would be readily appreciated by one having skill in the art that any other types of suitable connectors may be used. The tower 206 is a vertically elongated and erect structure, which as shown in FIG. 2A, oversees the annular powder bed 202. Preferably, also as shown in FIG. 2A, the tower 206, the rotating mechanism 204 and the annular powder bed are concentric, where the common center is point X as indicated in FIG. 2C. Preferably, for any given tower and rotating mechanism, annular powder beds of different sizes can be arranged concentrically around them. In other words, the diameter of the powder bed is typically greater than the diameter of the rotating mechanism and the width or diameter of the tower, although it does not have to be so restricted.

An irradiation beam directing mechanism used in the present invention may be an optical control unit for directing an irradiation beam such as a laser beam. The optical control unit may comprise one or more optical lenses (including telecentric lenses), deflectors, mirrors and/or beam splitters. Alternatively, the irradiation beam directing mechanism may be an electronic control unit for directing an electron beam. The electronic control unit may comprise one or more deflector coils, focusing coils and/or similar elements. In certain embodiments, the irradiation beam directing mechanism is composed of a diode fiber laser array (e.g. a diode laser bar or stack) that includes a plurality of diode lasers or emitters that each emit a beam of radiation. A cylindrical lens may be positioned between the diode lasers and a plurality of optical fibers. The cylindrical lens compensates for the high angular divergence in the direction perpendicular to the diode junction of the lasers, typically reducing the beam divergence in the fast axis to less than that of the slow axis, thereby easing the assembly tolerances of the overall system compared to an assembly which does not use any coupling optics (i.e., one in which each fiber is simply placed in close proximity to the laser to which it is to be coupled). However, it should be appreciated that diode fiber laser arrays that do not use coupling optics may be used with the present technology. In certain embodiments, the plurality of optical fibers may further include lenses at their respective ends that are configured to provide collimated or divergent laser beams from the optical fibers. It should also be appreciated that even in the absence of these lenses, the ends of the optical fibers may be adapted to provide collimated or divergent laser beams.

In certain embodiments, an irradiation beam directing mechanism in accordance with the present invention may also include an irradiation source that, in the case of a laser source, originates the photons comprising the laser irradiation that is directed by the mechanism. When the irradiation source is a laser source, then the irradiation beam directing mechanism may be, e.g. a galvo scanner, and the laser source may be located outside of the build environment. Under these circumstances, the laser irradiation may be transported to the irradiation beam directing mechanism by any suitable means, e.g. a fiber-optic cable. When the irradiation source is an electron source, then the electron source originates the electrons that comprise the electron beam or e-beam that is directed by the irradiation beam directing mechanism. When the irradiation source is an electron source, then the beam directing mechanism may be, e.g. a deflecting coil. When a large-scale additive manufacturing apparatus in accordance with the present invention is in operation, if the irradiation beam directing mechanism directs a laser beam, then generally it is advantageous to include a gas-flow mechanism providing a substantially laminar gas flow in a gas-flow zone. This is because the laser beam used can result in smoke production and the smoke can be condensed when it comes in contact with the built object, thereby jeopardizing the fidelity of the object. However, if an electron beam is instead used, it is important to maintain sufficient vacuum in the space through which the electron beam travels, hence a gas-flow mechanism should not be included in the build unit.

In further embodiments, an irradiation beam directing mechanism may include one or more electrical slip rings and/or telemetry for improved control of the movements of the mechanism in the rotating environment of a powder-based additive manufacturing process of the present invention.

In certain embodiments, the annular powder bed 202 and the central tower 206 may be additionally mounted on a stationary support structure 232. In a preferred embodiment, the apparatus 200 is encased within a build chamber and the atmosphere environment within the chamber, i.e. the "build environment", or "containment zone", is typically controlled such that the oxygen content is reduced relative to typical ambient air, and such that the environment is at a reduced pressure. In some embodiments, the build environment defines an inert atmosphere (e.g., an argon atmosphere). In further embodiments, the build environment defines a reducing atmosphere to minimize oxidation. In yet further embodiments, the build environment defines a vacuum.

As the powder-based additive manufacturing progresses and the additively built object grows, the build platform 228 may be lowered and raised accordingly. Accordingly, moving of the build platform upward or downward, deposition of powder, leveling of powder and beam irradiation occur simultaneously and continuously. Alternatively, the build platform 228 may be vertically stationary but the tower 206 may be configured to be vertically movable, e.g. move upward and downward as the manufacturing process progresses. Accordingly, moving of the tower upward or downward, deposition of powder, leveling of powder and beam irradiation occur simultaneously and continuously.

In certain embodiments, a build unit having a laser beam irradiation mechanism may advantageously include a gas-flow mechanism with gas inlet(s) and outlet(s) providing a substantially laminar gas flow in a gas-flow zone to a build area on the powder bed. This is because the laser beam used can result in smoke production and the smoke can be condensed when it comes in contact with the built object, thereby jeopardizing the fidelity of the object. However, if an electron beam is instead used, it is important to maintain sufficient vacuum in the space through which the electron beam travels, hence a gas-flow mechanism should not be included in the build unit.

Figure 3:
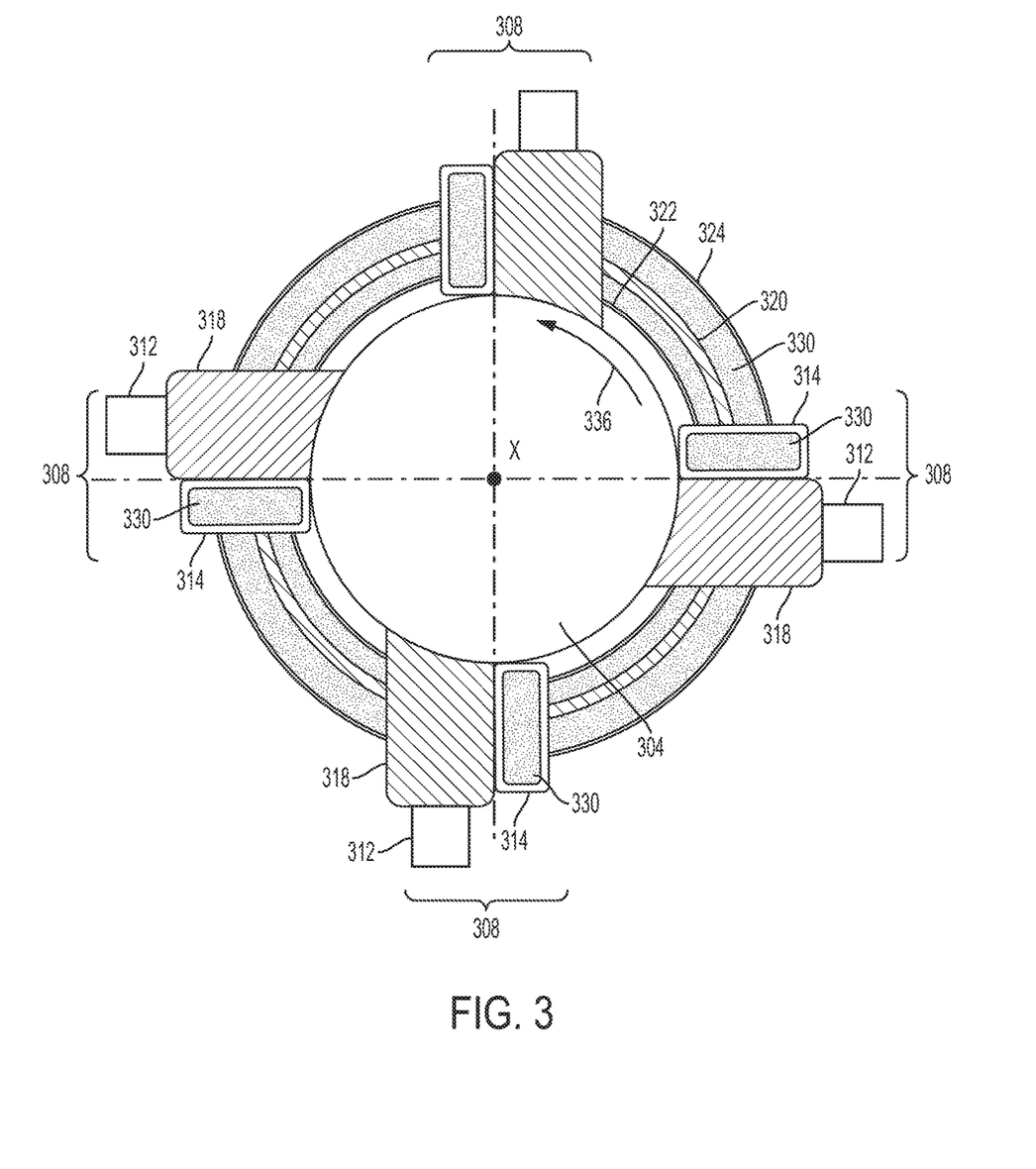
FIG. 3 is a schematic top view of a large-scale additive manufacturing apparatus according an embodiment of the present invention with an annular powder bed and a mechanism that rotates multiple build units.

The present invention further relates to a large-scale additive manufacturing apparatus, e.g. the apparatus 300 in FIG. 3 where multiple build units 308 may be attached to a central rotating mechanism 304 via supporting arms 318, which may then be attached and supported onto a central tower (not shown in this view). The rotating mechanism 304 rotates in, for example, the direction indicated by the arrow 336. Each build unit 308 has a powder delivery mechanism 314 (with powder 330), a powder recoating mechanism (not shown in this view) and an irradiation beam directing mechanism 312. The rotating mechanism 304, the tower and the annular powder bed 302 are preferably concentric at point X, with the rotating mechanism 304 and tower being in the center of the apparatus 300 and surrounded by the powder bed 302. Using the powder 330, each build unit is operable to additively manufacture a portion of the built object 320 in the annular powder bed 302 that is defined by an inner wall 324 and an outer wall 322.

Figure 4A:
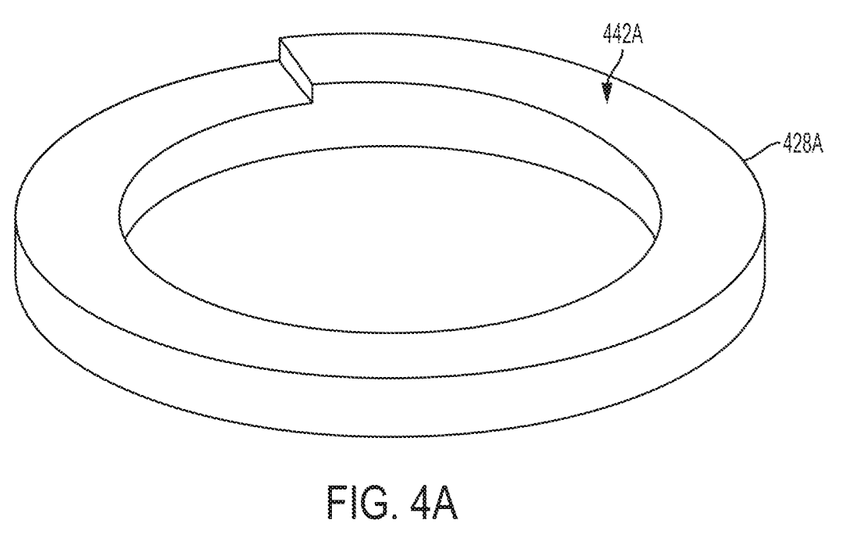
FIG. 4A is a perspective view of a single-helical floor of an annular powder bed according an embodiment of the present invention.
Figure 4B:
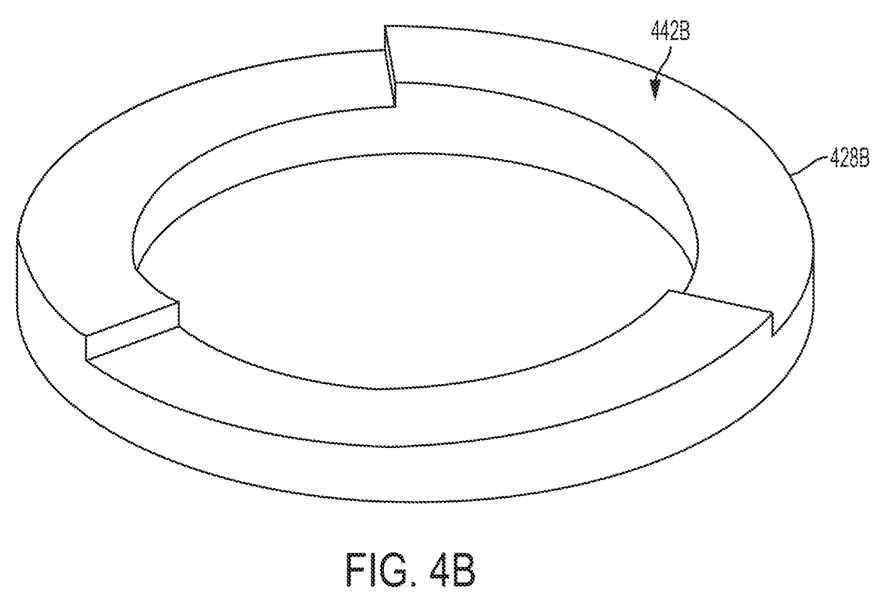
FIG. 4B is a perspective view of a triple-helical floor of an annular powder bed according an embodiment of the present invention.

In some embodiments, the build platform of the annular powder bed may have a generally subtle helical or spiral configuration that facilitates initiation of the continuous additive manufacturing process of the present invention (See FIGS. 4A and 4B). For example, when a large-scale additive manufacturing apparatus of the present invention has a single build unit, the single helical build platform 428A has a build surface 442A that "drops" a single additive growth layer thickness with every full 360° revolution of the rotating mechanism. As another example, when a large-scale additive manufacturing apparatus of the present invention has multiple build units, e.g. three build units, the triple helical build platform 428B has a build surface 442B that descends a single additive growth layer thickness with every 120° or ⅓ revolution of the rotating mechanism.

Figure 5A:
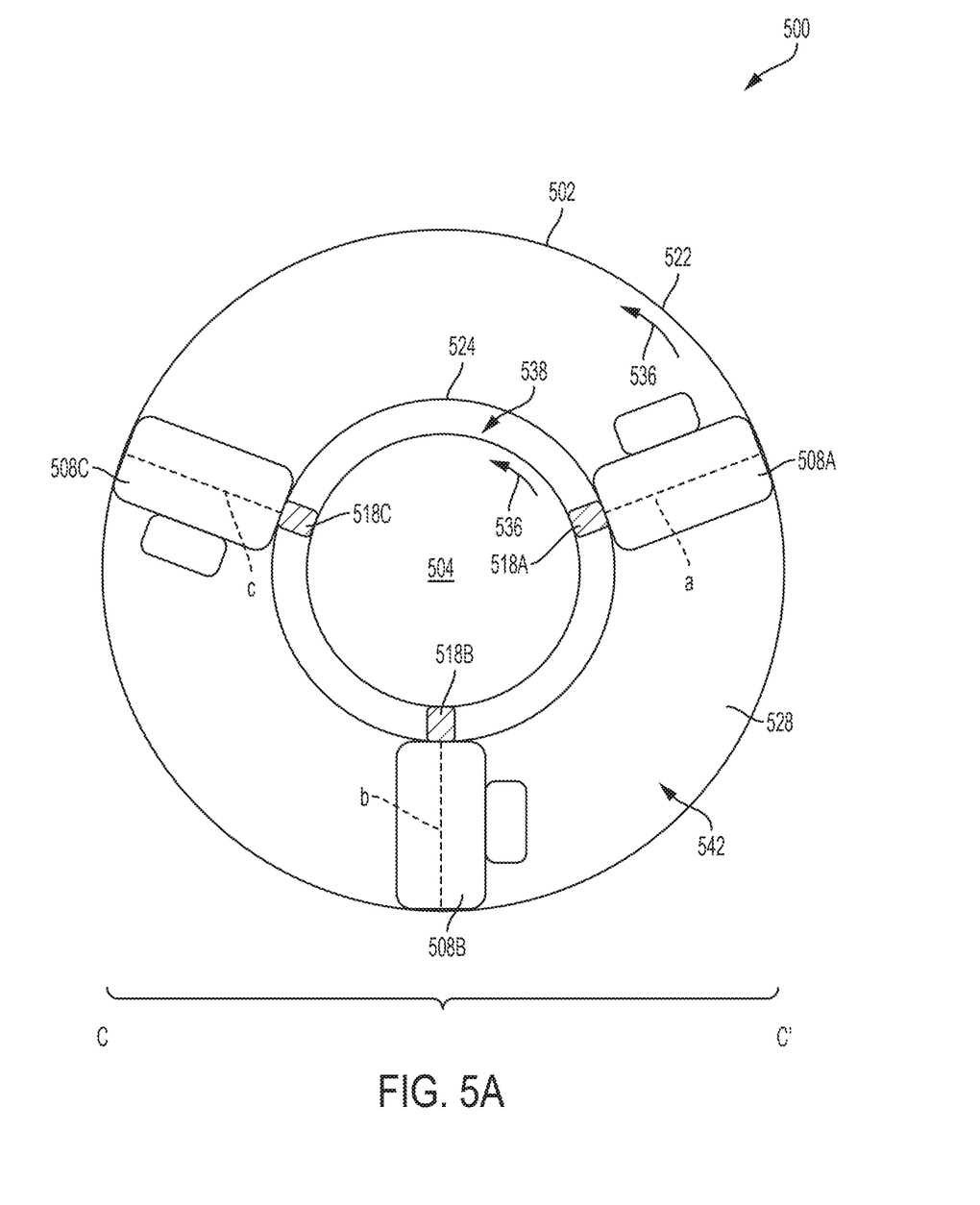
FIG. 5A is a top view of a large-scale additive manufacturing apparatus according to an embodiment of the present invention, where the annular powder bed has a triple helical floor.
Figure 5B:
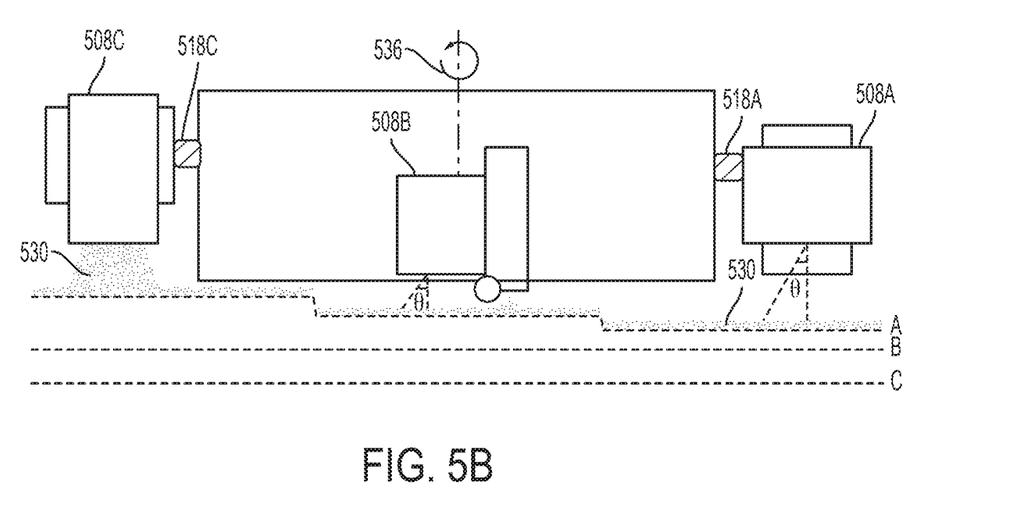
FIG. 5B is a C-C' side cross-sectional view of the large-scale additive manufacturing apparatus of FIG. 5A.

In FIGS. 5A and 5B, a top view and a C-C' side cross-sectional view of a large-scale additive manufacturing apparatus 500 are respectively shown. The apparatus 500 includes an annular powder bed 502 with an annular build platform 528, inner and outer walls 524, 522. The annular build platform 528 having a triple helical build surface 542 (i.e. the starting point of the three helices indicated with the dashed lines a, b and c); a rotating mechanism 504 having a rotational direction as indicated by the arrow 536 and with three build units 508A, 508B, 508C attached thereto (i.e. to the circumference 538) via supporting arms 518A, 518B and 518C; and a tower (not shown) to which the rotating mechanism is attached and supported onto. Each of the build units 508A, 508B, 508C is equipped with their respective beam directing mechanism, powder recoating mechanism powder delivery mechanism.

As shown in FIG. 5B, when multiple build units 508A, 508B and 508C are used, they may be used to deposit the powder 530 and fuse multiple overlapping additive layers (e.g. "layer A", "layer B", "layer C") in a helical configuration, similar to a multi-lead screw form. This helical configuration may be more efficient and less problematic than attempting to use multiple fusing units to form a single additive layer.

Figure 6A:
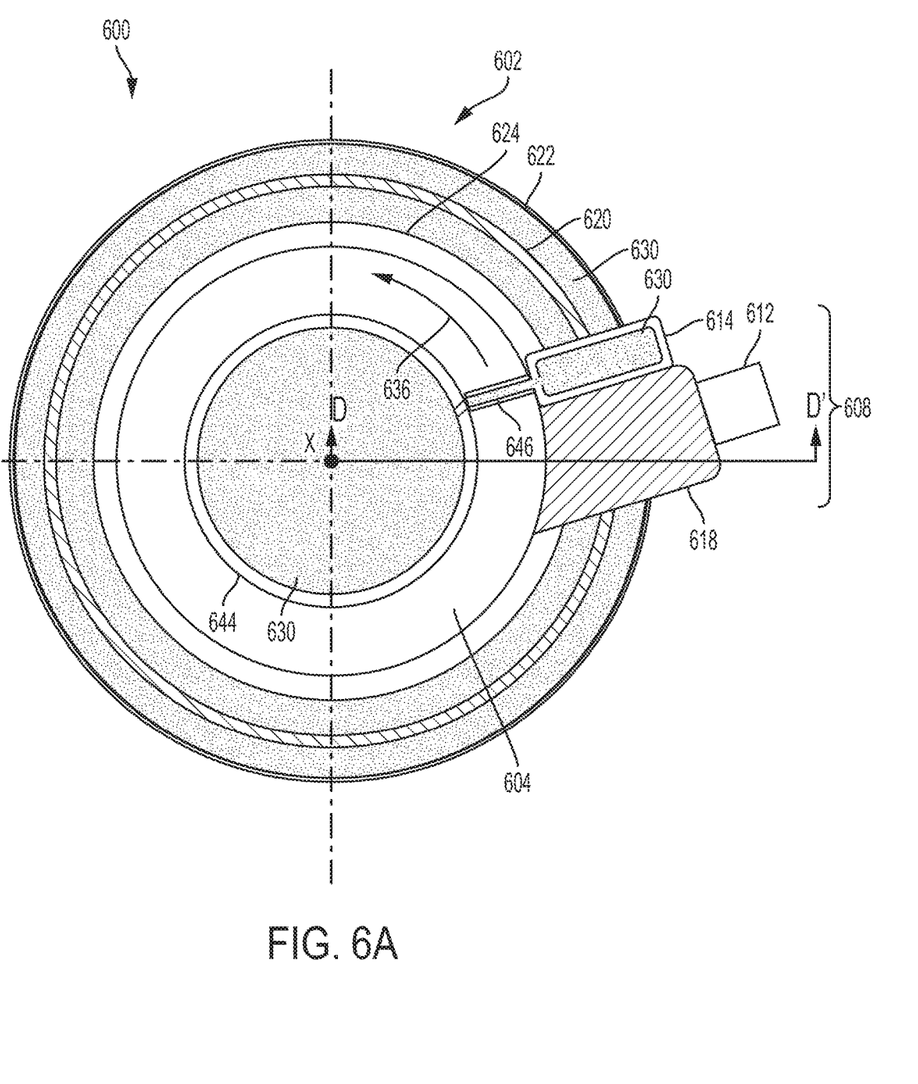
FIG. 6A is a schematic top view of a large-scale additive manufacturing apparatus with a large stationary powder delivery mechanism.
Figure 6B:
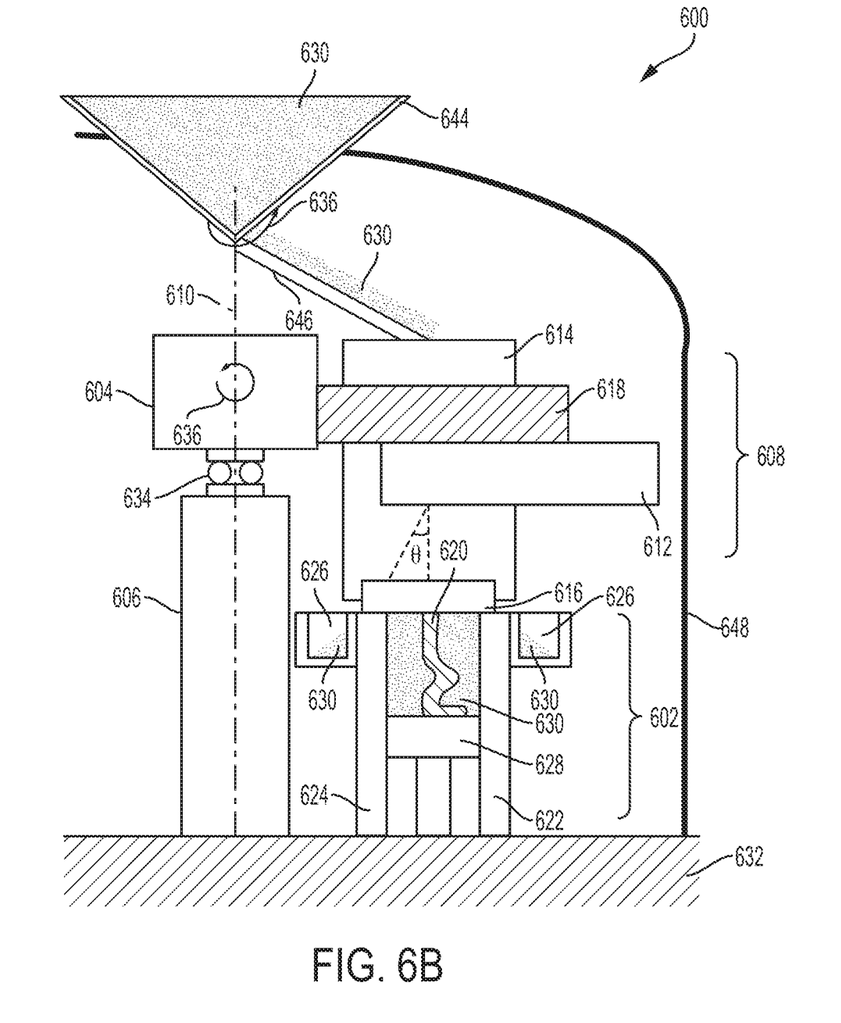
FIG. 6B is an D-D' side cross-sectional view of the large-scale additive manufacturing apparatus of FIG. 6A.

A further embodiment of a large-scale additive manufacturing apparatus of the present invention relates to such an apparatus, e.g. the apparatus 600 that, in addition to the powder delivery mechanism 614, powder recoating mechanism 616 and irradiation beam directing mechanism 612 in the build unit 608, further includes a central, large and stationary powder supply mechanism 644. Like other apparatuses of the present invention described herein, the apparatus 600 includes a rotating mechanism 604 configured to rotate around the rotational axis 610 in any of the two directions (e.g. direction indicated by the arrow 636) and whose circumference the build unit 608 (i.e. the powder delivery mechanism 614, powder recoating mechanism 616 and irradiation beam directing mechanism 612) may be attached to, for example, via a supporting arm 618. The rotating mechanism 604 may be supported onto a tower 606, for example, via a connector 634 (shown as a ball bearing that is sandwiched between an upper race and a lower race in this particular embodiment).

The powder supply mechanism 644 may be connected to the powder delivery mechanism 614, for example, via a feed chute 646 that preferably rotates along with the rotating mechanism 604 in the same direction (e.g. direction indicated by the arrow 636. Preferably, the powder supply mechanism 644, the feed chute 646, the tower 606, the rotating mechanism 604 and the annular powder bed 602 are concentric, for example, at point X as shown in FIG. 6A. Use of the large stationary powder supply mechanism 644 that is connected to the powder delivery mechanism 614 is especially advantageous because it reduces the weight of the powder 630 that is carried by the powder delivery mechanism 614 and also the supporting arm, both of which rotate during production.

The powder supply mechanism 644 may assume any suitable three-dimensional configuration. In one particular preferred embodiment, such as the embodiment of FIGS. 6A and 6B, the powder supply mechanism 644 is of a conical or funnel shape where the vertex 650 of the cone is connected to the feed chute 646. In this case, the vertex 650 is small opening that advantageously allows a controlled flow of the powder 630 onto the feed chute 646 and eventually, into the powder delivery mechanism 614.

As described above, a large-scale additive manufacturing apparatus of the present invention may be encased within a build chamber. FIG. 6B shows the build chamber 648 encasing the build unit 608, the tower 606, the rotating mechanism 604 and the annular powder bed 602 and the feed chute 646. The powder supply mechanism 644, on the other hand, is partially encased at the lower portion of the structure, e.g. the stem of a funnel or the vertex portion of a cone. In alternative embodiments, the feed chute 646 may be partially or not encased within a build chamber.

The annular powder bed 602 has a build platform 628, a circular inner wall 624 and a circular outer wall 622 with a diameter that is greater than the diameter of the inner wall 624. At the beginning of a powder-based additive manufacturing process, the raw material powder is deposited onto the build surface which is the top surface of the build platform 628 (not shown in the FIGS. 6A and 6B views). In some embodiments, such as the embodiment shown in FIGS. 6A and 6B, the inner and outer walls 624, 622 of the annular powder bed 602 each include a receptacle 626 to capture unfused powder spillover during production. In certain embodiments, the annular powder bed 602 and the central tower 606 may be additionally mounted on a stationary support structure 632.

The build unit 608 is operable to perform a powder-based additive manufacturing process such as but not limited to selective laser melting (SLM), direct metal laser melting (DMLM) and electron beam melting (EBM). During a powder-based additive manufacturing process, the powder delivery mechanism 614 directionally delivers and deposits a raw material powder 630 onto and/or into the powder bed 602. The powder recoating mechanism 616 directionally spreads and levels the deposited powder 630 into a substantially even powder layer, and a portion of this substantially even powder layer (i.e. a build area) is then melted by the laser or electron beam emitted by the irradiation beam directing mechanism 612 to form a fused, additive layer of the built object 620. This manufacturing cycle repeats itself, which results in multiple layers being stacked to form the growing built object 620. Although FIG. 6A shows a single built object 620, it should be appreciated that the large-scale additive manufacturing apparatus 600 may be used to additively and simultaneously manufacture multiple smaller objects in the annular powder bed 602. As the manufacturing process progresses, the powder 630 stored in the powder delivery mechanism 614 may be replenished by the abundant supply in the powder supply mechanism 644 via the feed chute 646.

The present invention further provides a method of manufacturing an object with an apparatus described herein, including an annular object, for example an aircraft component such as but not limited to turbine or vane shroudings, central engine shaft, casings, compressor liners, combustor liners, ducts, etc. In one embodiment, the method includes the steps of: (a) rotating at least one build unit around a center of rotation to deposit powder onto a build platform, such that the at least one build unit moves in a circular path about the center of rotation; (b) irradiating at least one selected portion of the powder to form at least one fused layer; and (c) repeating at least steps (a) and (b) to form the at least one object. In some embodiments, the method further includes a step (d) of leveling the at least one selected portion of the powder. Preferably, at least steps (a), (b) and (d) are carried out simultaneously and continuously. In some embodiments, the method further includes a step of moving the build platform vertically.

In another embodiment, the method of manufacturing includes the steps of: (a) feeding powder to at least one build unit; (b) rotating at least one build unit around a center of rotation to deposit the powder onto a build platform, such that the at least one build unit moves in a path that is preferably circular about the center of rotation; (c) irradiating at least one selected portion of the powder to form at least one fused layer; and (d) repeating at least steps (b) and (c) to form the at least one object. In some embodiments, the method further includes a step of (e) leveling the at least one selected portion of the powder. Preferably, steps (b), (c) and (e) are carried out simultaneously and continuously. In some embodiments, the method further includes a step of moving the build platform vertically.

The apparatuses and methods of the present invention may be combined with features of the apparatuses and methods described in the following patent applications by the applicant:

U.S. patent application Ser. No. 15/406,467, titled "Additive Manufacturing Using a Mobile Build Volume," and filed Jan. 13, 2017.

U.S. patent application Ser. No. 15/406,454, titled "Additive Manufacturing Using a Mobile Scan Area," and filed Jan. 13, 2017.

U.S. patent application Ser. No. 15/406,444, titled "Additive Manufacturing Using a Dynamically Grown Build Envelope," and filed Jan. 13, 2017.

U.S. patent application Ser. No. 15/406,461, titled "Additive Manufacturing Using a Selective Recoater," and filed Jan. 13, 2017.

U.S. patent application Ser. No. 15/406,471, titled "Large Scale Additive Machine," and filed Jan. 13, 2017.

The disclosures of each of these applications are incorporated herein in their entireties to the extent they disclose additional aspects of core-shell molds and methods of manufacturing that can be used in conjunction with the core-shell molds disclosed herein.

Further aspects of the invention are provided by the subject matter of the following clauses:

1. A method of manufacturing at least one object, comprising: (a) rotating at least one build unit in a circular path around a center of rotation to deposit powder onto a build platform, wherein the build platform is positioned between an inner wall and an outer wall; (b) irradiating at least one selected portion of the powder to form at least one fused layer; (c) moving the build platform relative to the inner wall and the outer wall; and (d) repeating at least steps (a) through (c) to form the at least one object.

2. The method of any preceding clause, further comprising: (e) leveling the at least one selected portion of the powder.

3. The method of any preceding clause, wherein at least steps (a), (b), (c), and (e) are carried out simultaneously and continuously.

4. The method of any preceding clause, wherein the build platform is moved along a vertical direction.

5. The method of any preceding clause, wherein the circular path is defined about the vertical direction.

6. The method of any preceding clause, wherein the powder is deposited in a helical configuration.

7. The method of any preceding clause, wherein the at least one build unit is mounted to a rotating mechanism that is supported onto a tower and wherein the build platform, the rotating mechanism, and the tower are concentric.

8. The method of any preceding clause, further comprising: moving the tower along a vertical direction.

9. The method of any preceding clause, wherein a portion of the at least one build unit is attached to the circumference of the rotating mechanism.

10. The method of any preceding clause, wherein the at least one build unit comprises: a plurality of build units spaced apart along the circular path.

11. The method of any preceding clause, wherein the build platform is annular.

12. The method of any preceding clause, wherein the build platform is non-rotating and vertically stationary.

13. The method of any preceding clause, wherein the build platform is non-rotating and vertically movable.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method of manufacturing at least one object, comprising:
   (a) rotating at least one build unit in a circular path around a center of rotation to deposit powder onto a build platform, wherein the build platform is positioned between an inner wall and an outer wall;
   (b) irradiating at least one selected portion of the powder to form at least one fused layer;
   (c) moving the build platform relative to the inner wall and the outer wall; and
   (d) repeating at least steps (a) through (c) to form the at least one object.

2. The method of claim 1, further comprising:
   (e) leveling the at least one selected portion of the powder.

3. The method of claim 2, wherein at least steps (a), (b), (c), and (e) are carried out simultaneously and continuously.

4. The method of claim 1, wherein the build platform is moved along a vertical direction.

5. The method of claim 4, wherein the circular path is defined about the vertical direction.

6. The method of claim 1, wherein the build platform includes a build surface that has a helical configuration.

7. The method of claim 1, wherein the at least one build unit is mounted to a rotating mechanism that is supported onto a tower and wherein the build platform, the rotating mechanism, and the tower are concentric.

8. The method of claim 7, further comprising:
   moving the tower along a vertical direction.

9. The method of claim 7, wherein a portion of the at least one build unit is attached to a circumference of the rotating mechanism.

10. The method of claim 1, wherein the at least one build unit comprises:
    a plurality of build units spaced apart along the circular path.

11. The method of claim 1, wherein the build platform is annular.

12. The method of claim 1, wherein the build platform is non-rotating and vertically stationary.

13. The method of claim 1, wherein the build platform is non-rotating and vertically movable.

* * * * *